US00H002108H1

(19) United States

(12) Statutory Invention Registration (10) Reg. No.: US H2108 H

Dewan et al. (43) Published: Aug. 3, 2004

(54) OPTICAL TURBULENCE MODEL FOR RADIOSONDE DATA

(75) Inventors: Edmond M. Dewan, Lexington, MA (US); Robert R. Beland, Boston, MA (US); James H. Brown, Wellesley, MA (US); R. Earl Good, Albuquerque, NM (US)

(73) Assignee: The United States of America as represented by the Secretary of the Air Force, Washington, DC (US)

(21) Appl. No.: 09/865,930

(22) Filed: May 29, 2001

(51) Int. Cl.[7] ..... G06F 19/00

(52) U.S. Cl. ..... 702/3; 73/170.7; 73/170.28; 73/170 R

(58) Field of Search ..... 73/170.07, 170.28, 73/170 R; 702/3

(56) References Cited

U.S. PATENT DOCUMENTS 5,974,875 A * 11/1999 Leslie et al. ..... 73/170.07

OTHER PUBLICATIONS

"Measurements of Atmospheric Turbulence Relevant to Optical Propagation", 6/70, Lawrence et al. in Journal of the Optical Society of America, vol. 60, No. 6, p. 826–830.*

* cited by examiner

*Primary Examiner*—Michael J. Carone
*Assistant Examiner*—M. Thomson

(57) ABSTRACT

The structure constant, $C_n^2$, for optical index of refraction fluctuations is the key to the design of adaptive optical systems that minimize the effects of turbulence on laser beam propagation. This invention uses our model, which converts standard radiosonde data into $C_n^2$ profiles. The results are compared to directly measured in situ values of $C_n^2$ obtained by means of balloon borne thermosondes.

4 Claims, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Method for assigning $S_{raw}$ to $\langle L^{4/3} \rangle$. (Uses weighted average. Eq (7).)

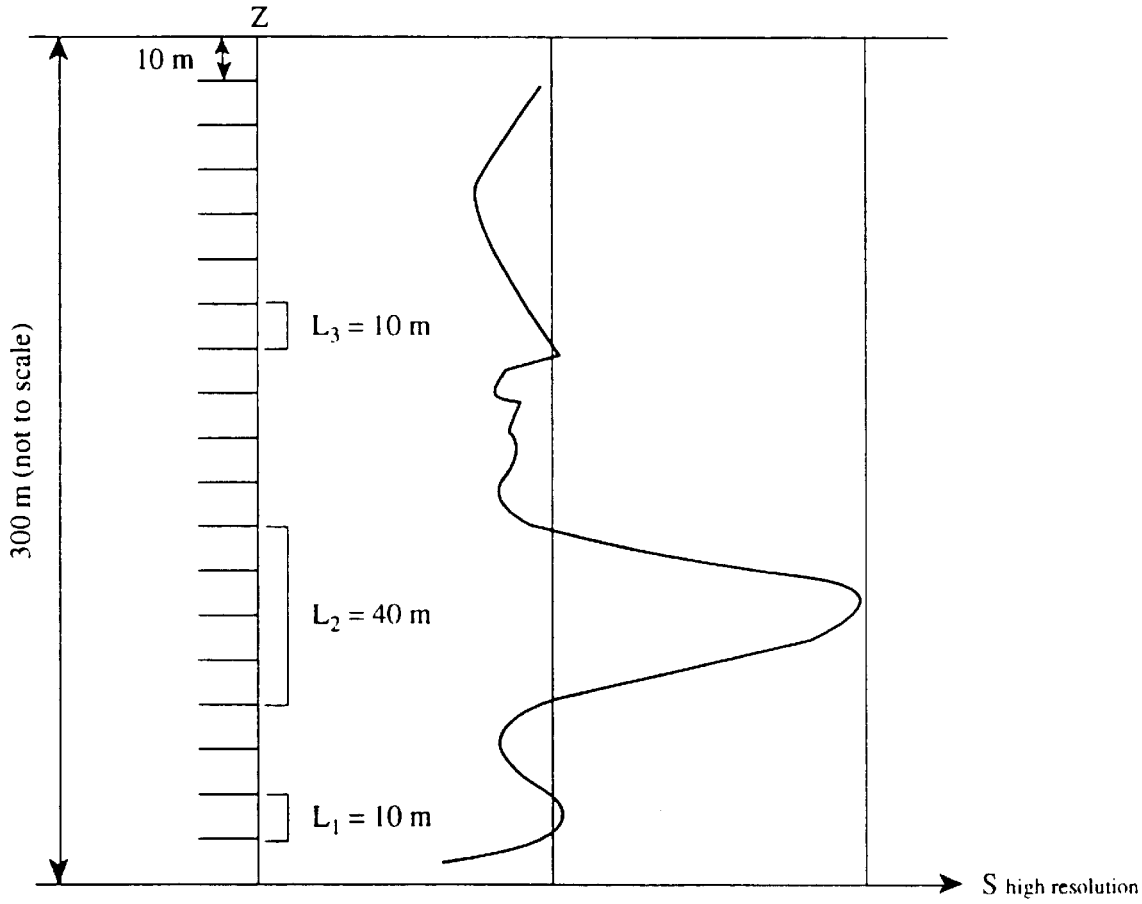
Figure 1 — Method for assigning $S_{raw}$ to $\langle L^{4/3} \rangle$.
(Uses weighted average, Eq (7).)

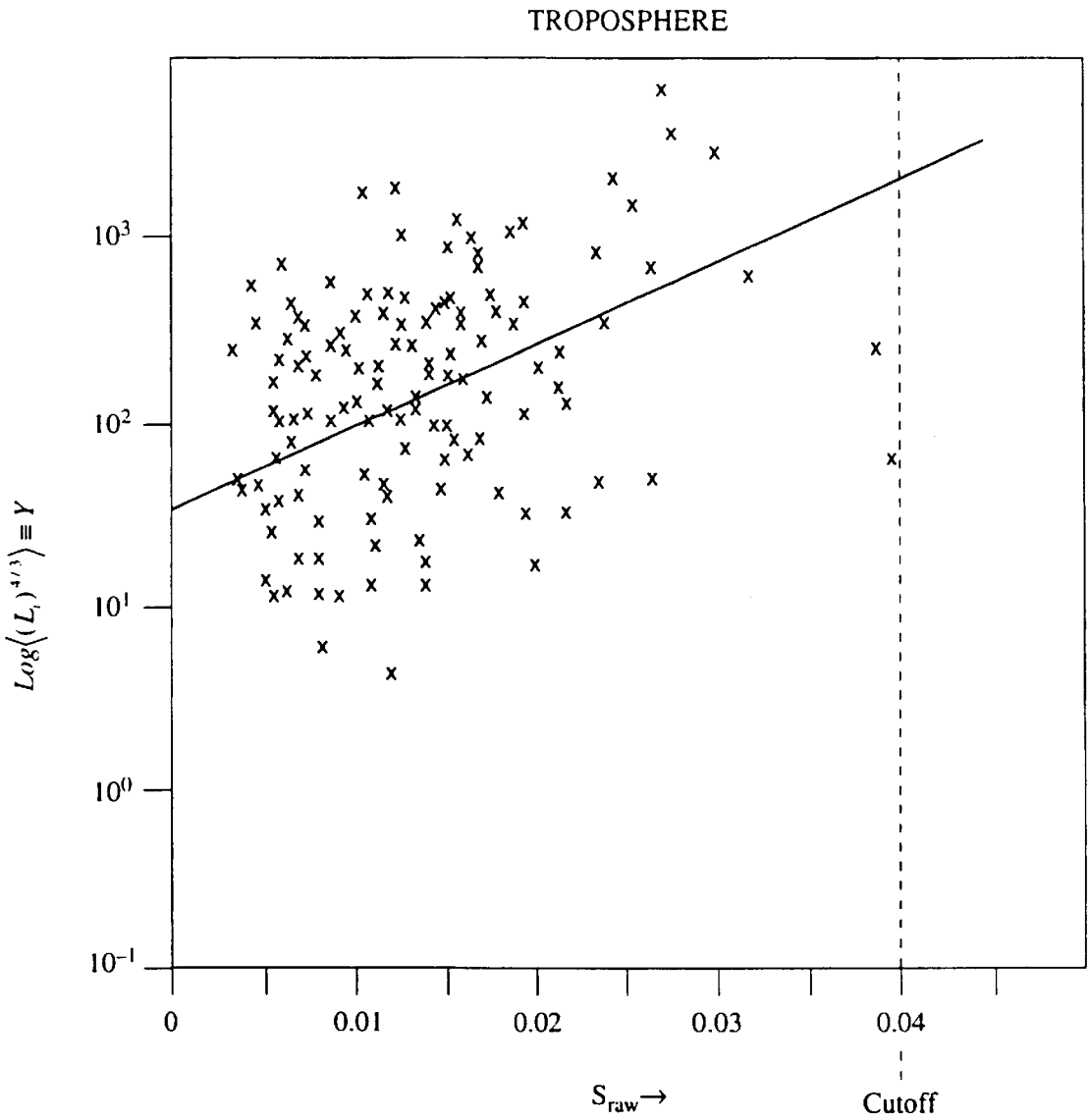
Figure 2 — $10^Y$ vs $S_{raw}$ Regression. This is the Regression for the Tropospheric Model ($S_c$ = 0.015).

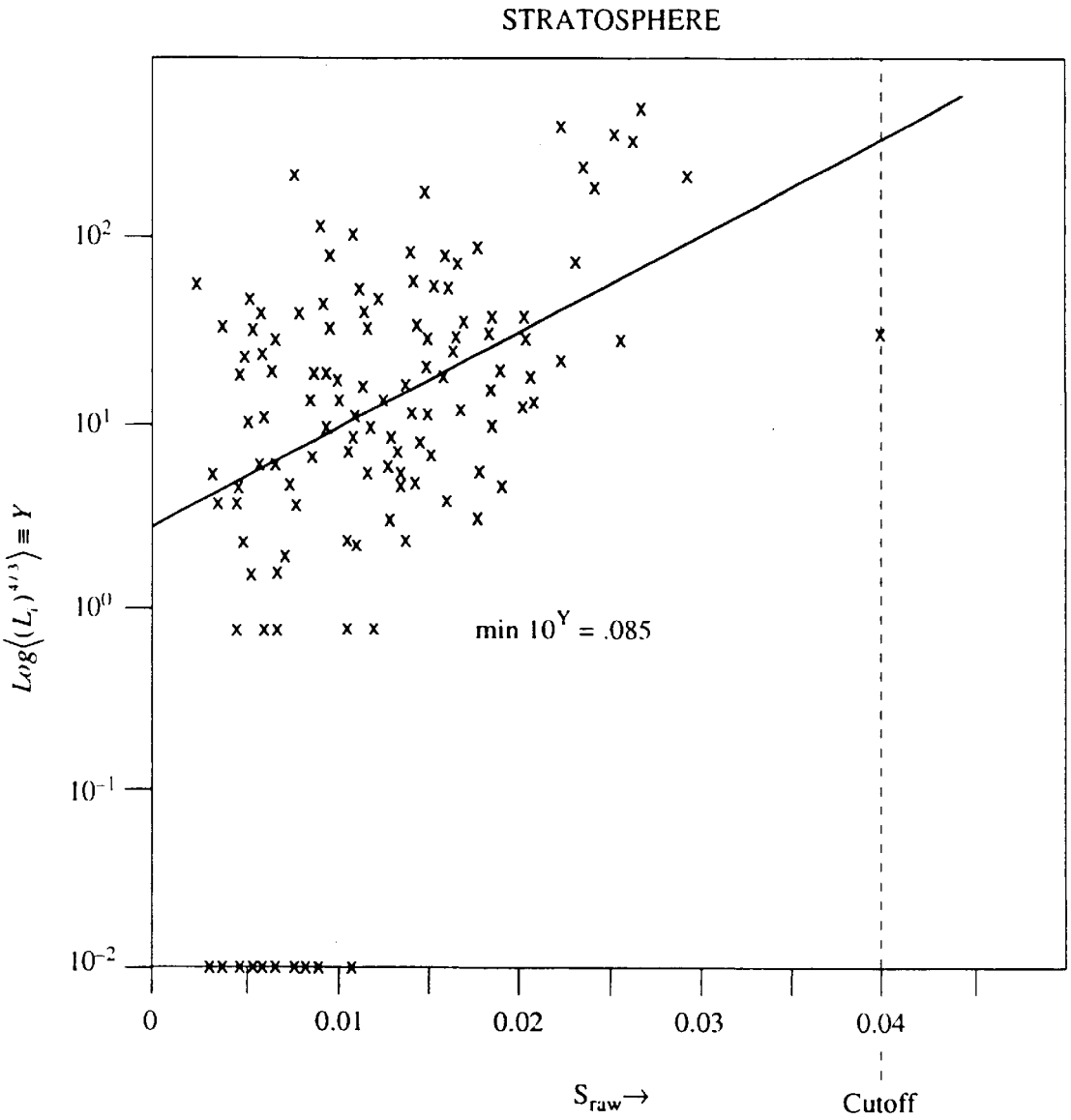
Figure 3 — Regression for the Stratospheric Model ($S_c$ = 0.03).

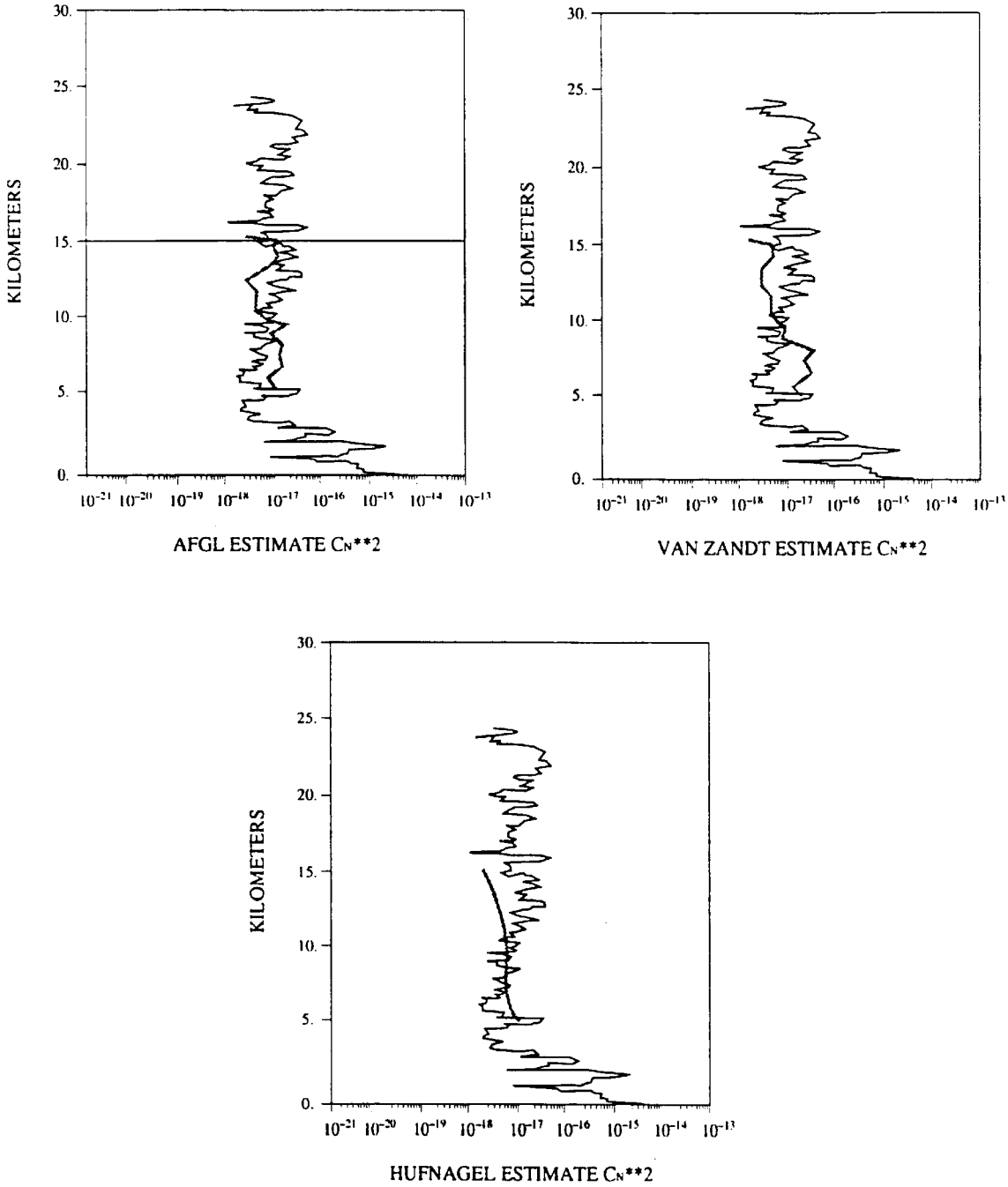
Figure 4 — #1 Tables 1, 2, and 3. (Model and Data Comparisons in CLEAR-1).

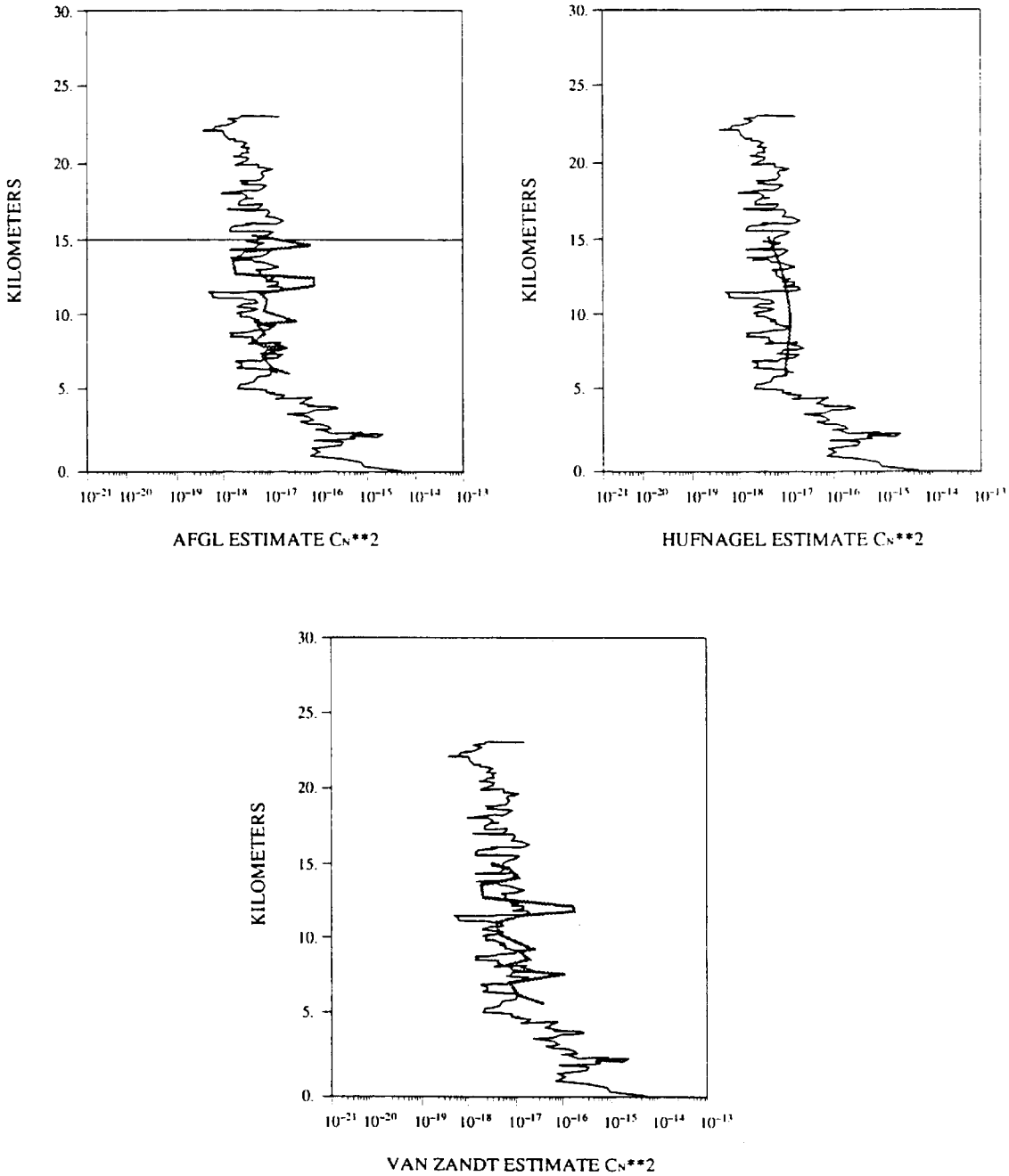
Figure 5 — #4 in Tables 1, 2, and 3. (Model and Data Comparisons in CLEAR-1).

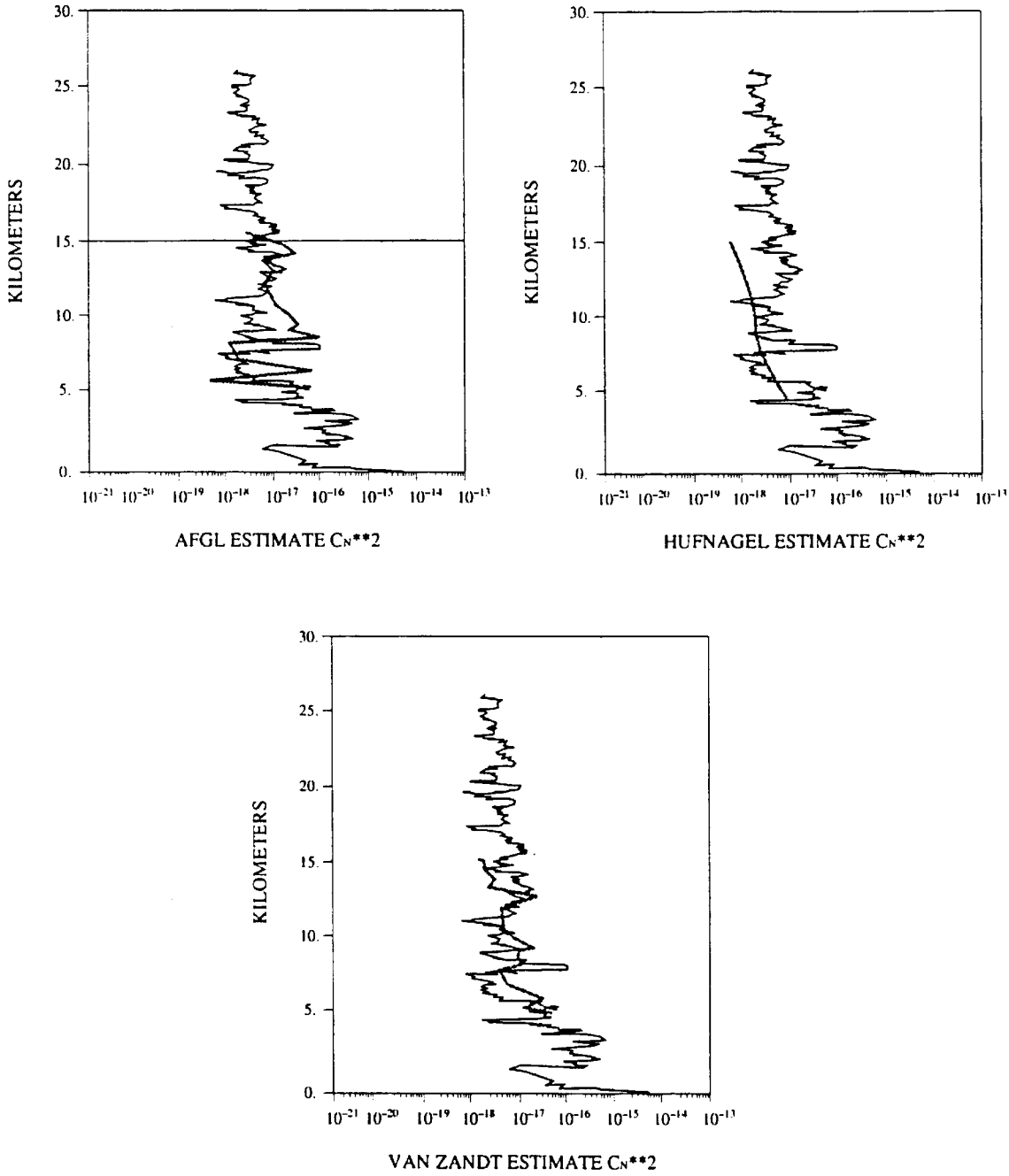
Figure 6 — #10 in Tables 1, 2, and 3. (Model and Data Comparisons in CLEAR-1).

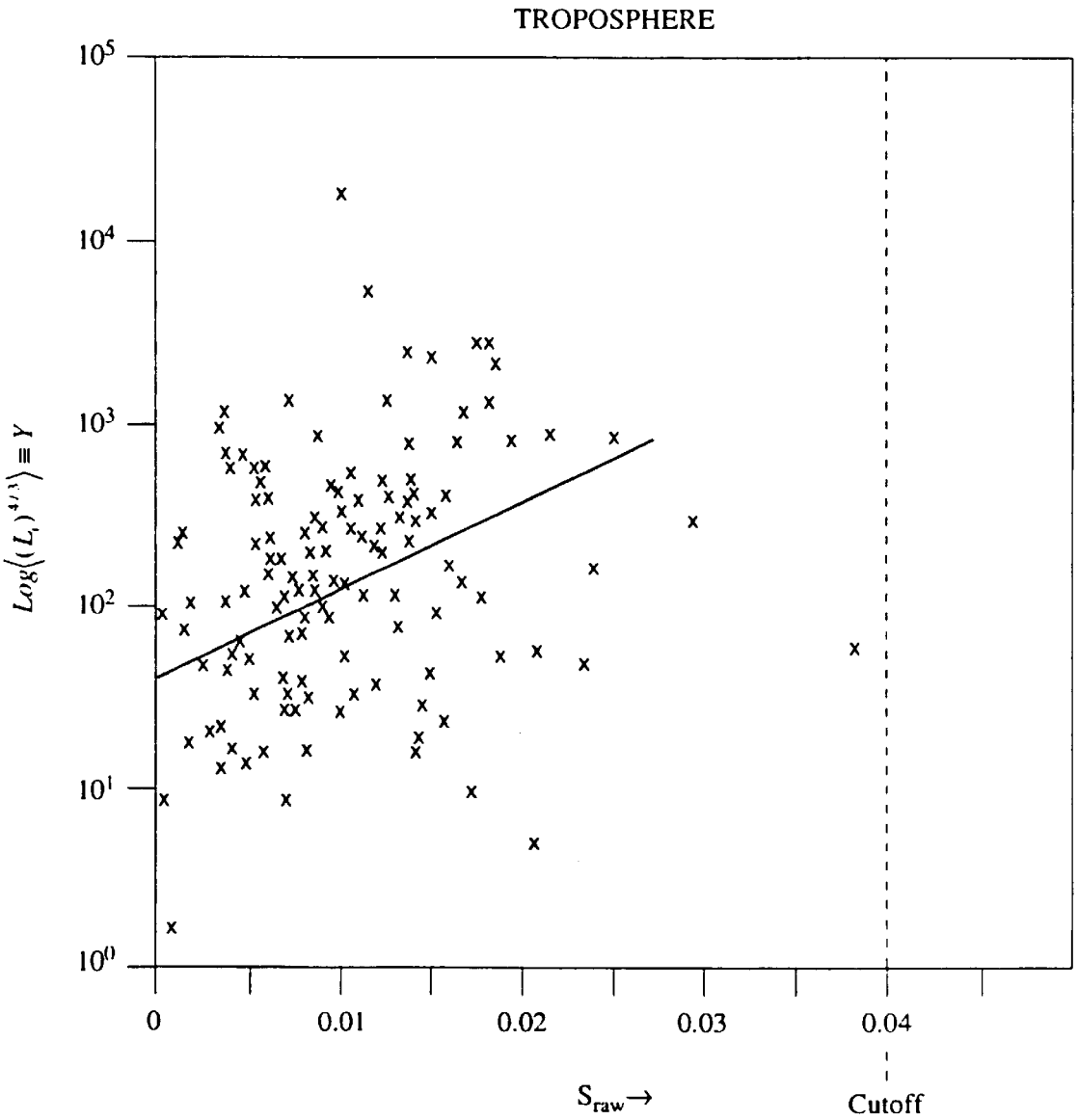
Figure 7 — Tropospheric Alternative Model.

OPTICAL TURBULENCE MODEL FOR RADIOSONDE DATA

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to atmospheric models of optical turbulence and more specifically to an application of a mathematical equation that can be programmed into a computer which converts the usual radiosonde data (weather balloon) to the optical turbulence parameter, $C_n^2$. It can also be programmed into a weather forecasting model to forecast optical turbulence. The latter will be used by the Air Force in order to serve as an electronic decision aid so that, for example, one can position the Airborne Laser (ABL) weapon in a location which will, on a given day, have a minimum of turbulence between weapon and the theater missile target. (The presence of too much turbulence can degrade weapon effectiveness.)

As the acquisition of accurate knowledge of meteorologic conditions in the upper atmosphere has become increasingly important, devices have been developed to satisfy these requirements. As a result of the availability of this data, meteorologists are better able to make their predictions of future weather conditions.

One such atmospheric meteorological sensing and telemetering system is described in U.S. Pat. No. 3,781,715 by Poppe et al, the disclosure of which is incorporated herein by reference. The Poppe radiosonde includes a number of meteorological parameter sensors, which are generally of the type having an electrical parameter, e.g., resistance, which is proportional to the sensed meteorological parameters, e.g., temperature. The sensor is connected as part of a meteorological data generator, which produces a signal utilized to modulate a carrier signal. The thus modulated carrier is thereafter transmitted by a suitable antenna carried by the radiosonde and received and processed at a remote, ground-based weather tracking station.

For the information transmitted by the weather radiosonde to be most meaningful, it must be correlated to meteorological data.

Currently, models are needed to convert standard meteorological data into vertical profiles of $C_n^2$, the structure constant for optical index of refraction fluctuations. Profiles of $C_n^2$ from the ground to 20 or 30 km are needed to ascertain the effects of turbulence on laser beam propagation from ground to space as well as on light propagation from space to ground. Such information would be available in large quantities if radiosonde information could be converted to $C_n^2$ profiles. Such information could then be used for assigning design parameters for adaptive optical systems, which can greatly reduce the effect of turbulence. When the $C_n^2$ model is incorporated into a three-dimensional forecast model (or electronic decision aid) then it will be possible to calculate the effects of turbulence on air to air propagation geometry as will be the case for the ABL and the theater missile target.

This discussion describes our radiosonde $C_n^2$ model and tests of it. Note that this model does not relate to the convective boundary layer and our tests will be applied with this in mind. Other models exist for the boundary layer and these would be added, for example, when parameters such as $r_o$ the coherence length, are estimated because $r_o$ is sensitive to near-ground $C_n^2$. In this report we will only consider parameters sensitive to $C_n^2$ above the boundary layer.

This invention description describes how the AFGL model was created from very high resolution velocity profiles that we obtained in the stratosphere by means of rocket laid smoke trails; next it will explain how the resulting model is used to convert radiosonde data into $C_n^2$ profiles. Then, comparisons between model and thermosonde profiles of $C_n^2$ will be made.

At the end of the discussion some comments will be made about the lessons we learned in this research. Suggestions for future research will also be offered.

SUMMARY OF THE INVENTION

The present invention is an application of a mathematical equation that can be programmed into a computer, which converts the usual radiosonde data (weather balloon), to the optical turbulence parameter, $C_n^2$. It can also be programmed into a weather forecasting model to forecast optical turbulence. The structure constant, $C_n^2$, for optical index of refraction fluctuations is the key to the design of adaptive optical systems that minimize the effects of turbulence on laser beam propagation. This invention uses our model, which converts standard radiosonde data into $C_n^2$ profiles. The results are compared to directly measured in situ values of $C_n^2$ obtained by means of balloon borne thermosondes.

The present invention may be defined as a process for estimating optical turbulence $C_n^2$ using either radiosonde data or data contained within a weather forecasting computer model. The process includes the steps of:

- collecting radiosonde data for an area of interest, the radiosonde data including measurements of:
- absolute temperature in degrees K (°K), pressure (P) in mB, dry adiabatic lapse rate (γ) winds (n/s) and a measure of height above ground in meters(m); (or, alternatively, these data in a weather forecast model)
- determining an estimate of the largest scale of inertial range turbulence(L); and calculating an estimate for the optical turbulence from the radiosonde data and from L.

In the process of the invention the calculating step is performed by $$C_n^2 = 2.8 M^2 L^{4/3}$$

where:

$$M^2 = \left[\left(\frac{79 \times 10^{-6} P}{T^2}\right)\left(\frac{dT}{dz} + \gamma\right)\right]^2$$

and where T is absolute atmospheric temperature in °K, P is pressure in mb, γ is the dry adiabatic lapse rate of $9.8 \times 10^{-3}$ °K/m, and z is the height above ground.

The innovative feature of the invention includes the estimate of L, the scale of inertial range turbulence from radiosonde data or from computer weather forecast data, as discussed below.

DESCRIPTION OF THE DRAWINGS

FIG. 1 is an illustration of how turbulent layers are determined. By means of these computer runs one can estimate the effects of high resolution shears on turbulence given the low resolution shear input data.

FIG. 2 is a plot of Y=log $<(L)_1^{4/3}>$ vs $S_{raw}$ on log-linear graph, for the troposphere.

FIG. 3 is a plot of Y=log $<(L)_1^{4/3}>$ vs $S_{raw}$ on a log-linear graph, for the stratosphere.

FIG. 4 is comparisons between the Thermosonde Derived Profiles and A) the AFGL Model; B) the Van Zandt (NOAA) Model; and C) the Hufnagel model for Flight No. 1 of the CLEAR-1 Program.

FIG. 5 is comparisons between the Thermosonde Derived Profiles and A) the AFGL Model; B) the Van Zandt (NOAA) Model; and C) the Hufnagel model for Flight No. 4 of the CLEAR-1 Program.

FIG. 6 is comparisons between the Thermosonde Derived Profiles and A) the AFGL Model; B) the Van Zandt (NOAA) Model; and C) the Hufnagel model for Flight No. 10 of the CLEAR-1 Program.

FIG. 7 is a plot of Y=log $<(L)_1^{4/3}>$ vs $S_{raw}$ on a log-linear graph, for the Tropospheric Alternate Model.

DETAILED DESCRIPTION OF THE PREFERRED EMBODIMENT

Basic Concepts

The key equation for the AFBL model is:

$$C_n^2=2.8M^2\,L^{4/3} \tag{1}$$

where:

$$M^2=\left[\left(\frac{79\times10^{-6}P}{T^2}\right)\left(\frac{dT}{dz}+\gamma\right)\right]^2 \tag{2}$$

and where T is absolute atmospheric temperature in °K, P is pressure in mb, γ is the dry adiabatic lapse rate of $9.8\times10^{-3}$ °K/m, and z is the height above ground. Radiosondes give us P and T directly, but L in Eq. (1) is "the outer length," that is, the largest scale of inertial range turbulence. This is the unknown that our model will supply. A good rule of thumb is that L would be of the order of 0.1 times the thickness of a turbulent layer. In principle this could be used in the future as an adjustable parameter (that is, one could use values other than 0.1) but at present using other values seems to be unnecessary.

We now consider the question "How can one estimate L from radiosonde data?" which will occupy us. It is generally known that above the convective boundary layer, atmospheric turbulence occurs in thin layers shaped like pancakes that are miles in width and tens of meters thick (usually). A shear type of instability leads to the formation of the layers, and the shears are generally caused by gravity waves (Dewan and Good, 1986). We used the common rule of thumb.

$$Ri\equiv N^2/S^2<0.25 \tag{3}$$

where Ri is the Richardson number, N is the buoyancy frequency, and S is the vector vertical shear of the horizontal velocity defined as $$S\equiv\left[\left(\frac{dV_N}{dz}\right)^2+\left(\frac{dV_E}{dz}\right)^2\right]^{1/2} \tag{4}$$

Where $V_N$ and $V_E$ are the north and east horizontal wind components. In a paper as yet unpublished, by Dewan and Good, we found that data supported the instability criterion $$S_C)^2>(N)^2(0.5)^{-1} \tag{5}$$

and, in the present report we shall use Eq. (5).

Standard radiosondes report data, such as velocity, at intervals of 300 m and larger. When such velocities are used in Eq. (4), only rarely will condition (5) hold. Presumably, since one expects that the layers are of order 1/10 the resolution of the radiosondes, the shears responsible must be on that same scale. Van Zandt et al (1981) pointed this out and indicated the resultant need for a statistical model to estimate small scale wind structure. We must use a statistical association between the large scale shears, called $S_{raw}$ here (that are measured by radiosondes) and the average of $L^{4/3}$ contained within the 300 m height range, which are based on the small scale but unmeasurable shears.

The Small Scale L-Model

To obtain the statistical association mentioned above we used our high resolution (10 m) stratospheric velocity profiles described in Dewan et al (1984). In all, these data consisted of 55.3 km of velocity profile information. The choice of 300 m for "radiosonde scale", is not as arbitrary as might appear. It is based in part on subsequent model performance.

Our procedure is described with reference to FIG. 1. The first step is to obtain the high resolution shears (from the previously mentioned 10 m winds) as a function of z by using Eq. (4). Using Eq. (5) and the US Standard Atmosphere we found that $S_C$=0.015 $s^{-1}$ for the troposphere and 0.03 $s^{-1}$ for the stratosphere. Next, all shear regions exceeding $S_C$ are presumed turbulent. As shown in FIG. 1, turbulent layer thicknesses, $\mathscr{L}_1$ are assigned to these regions. We will use:

$$L_i=1/10\mathscr{L}_i \tag{6}$$

but the 1/10 factor is not taken into account until the model is actually applied to the radiosonde data.

Next, we obtained a weighted average of $(\mathscr{L}_i)^{4/3}$ from $$<\mathscr{L}_i^{4/3}>\equiv\Sigma\mathscr{L}_i^{4/3}(\mathscr{L}_i/290) \tag{7}$$

Occasionally a layer $L_1$ will protrude outside of the 300 m region of interest. In such a case the $\mathscr{L}_i$ in the term $\mathscr{L}_1$/290) of Eq. (7) is reduced to include only the amount of $\mathscr{L}_i$ within the 300 m region.

Several methods to obtain $S_{raw}$ are available; however, in the model of choice, (on the basis of performance) we first smoothed the velocities with an 11 point running average and then differences the velocities across the 300 m region and divided the result by 300 m. This gave us $S_{raw}$. Finally we plotted $<\mathscr{L}_i^{4/3}>$ against $S_{raw}$ in FIGS. 2 and 3 on a log-linear plot and obtained a straight line regression in these coordinates. The maximum raw shear used in the regression was 0.045 $s^{-1}$. The resulting models are:

$$\log<\mathscr{L}_i^{4/3}>\equiv Y=1.64+42.0\,S_{raw} \tag{8}$$

$$Y=0.506+50.0\,S_{raw} \tag{9}$$

This is to be used in Eq. (10) below.

These regressions were obtained from data analyzed for every 10 m (that is, the 300 m region was shifted by 10 m for each output pair of $<L_1^{4/3}>$ and $S_{raw}$). It is clear that the number of independent points was 1/30 of the total number of pints (the latter being of order 4,000). For this reason only every 30th point is exhibited in FIGS. 2 and 3. Taking this into account, we estimated (slightly overestimated) the standard deviations for the regressions as:

$$\sigma_{slope}=6.9$$

$$\sigma_{const}=6\times10^{-2}$$

These are based on (Bevington (1969))

$$\sigma_{fit}^2=[1/(N-2)]\Sigma(y_i-a-bx_i^2$$

$$\sigma_{slope}^2=\sigma_{fit}^2/\Sigma(x_i)^2$$

$$\sigma_{const}^2=\sigma_{fit}^2/N$$

Using a representative value of $S_{raw}$=0.02 $s^{-1}$ we estimate that the spread in the measurements introduces an uncertainty of about a factor of 1.6 in $C_n^2$. Generally such a spread is unsatisfactory; but since $C_n^2$ can vary over a range of several orders of magnitude, a factor of 1.6 is considered to be essentially negligible.

FIGS. 2 and 3 show a large scatter of data points about the lines. In spite of this we will see that the model performs well. The explanation lies in the fact that the standard deviation of a linear regression is like that of a mean quantity: an additional factor of the square root of a number of independent cases is involved in the "standard error" of the mean.

While Eq. (8) is the model of choice, a slightly different model was employed below, namely:

$$\text{troposphere } Y=1.57+40.0\ S_{raw}$$

$$\text{stratosphere } Y=0.503+51.2\ S_{raw} \tag{9}$$

but the difference is not important to model performance.

An additional point must be made regarding the application of our model to the troposphere. As has been mentioned, all of the velocities in our statistical database are from the stratosphere. For this reason we must assume that this database does not differ significantly in shear statistics from actual tropospheric statistical characteristics. (Hopefully future modifications of this basic patent will be based on actual tropospheric statistics.)

Model Application to Radiosonde Data

Our model consists essentially of Eq. (1). Equation (2) is evaluated directly from raw radiosonde information. When we used high resolution pressure and temperature sensors, we preprocessed the data in a manner to be described. Using Eq. (4), the velocity information was converted into shears, which were then inserted in to Eq. (9) to obtain $Y\equiv\log_{10}<\mathscr{L}^{4/3}>$. Finally, the $C_n^2$ (z) profile was obtained from:

$$C_n^2(z)=2.8(0.1)^{4/3}M^2 10^Y \tag{10}$$

where the factor (0.1) comes from Eq. (6). Note that Eq. (9) contains in effect two independent pieces of the model that are applied to the stratosphere and troposphere separately. Thus, to apply this AFGL model one must first ascertain the altitude of the tropopause. In all the cases we studied this was unambiguous; but this may or may not be a problem when the model is applied to a larger volume of data, since tropopause height can be ambiguous, as is known from published data. In connecting the tropospheric model to the stratospheric model we used linear interpolation. Finally, it should be mentioned that it was necessary to build certain upper limits into the model. If the raw shear is greater than 0.04, the model assigns the value 0.04 to the shear. This was necessary because a single outlier shear due to an artifact could totally dominate the effects of the entire $C_n^2$ profile.

Similarly, we also placed an upper limit on dT/dz in the tropospheric model. We never allowed it to exceed zero and all gradients which did were set equal to $10^{-6}$. The stratospheric model would most likely require a positive upper limit on the temperature gradient but this is left to future research because raw radiosonde information in that region was limited when this report was written.

Model Tests

As was mentioned in the introduction, we compared the model $C_n^2$ profiles to both experimental profiles and to the profiles generated by the VanZandt and Hufnagel models (described in the open literature). To parameterize the relative performance of these models, we constructed two "figures of merit" based upon two crucial adaptive optical parameters. These were the isoplanatic angle, $\theta_o^2$, and the variance due to scintillation, $\sigma_\chi^2$. These are obtained from:

$$\theta_{o(\text{rad})}=\left\{2.91k^2\int_{Z_1}^{Z_2}C_n^2(z)(z)^{5/3}dz\right\}^{-3/5} \tag{11}$$

where k is the optical wave number$\equiv2\pi/\lambda$, and $$\sigma_\chi^2\equiv<In(A/A_o)^2>=0.56k^{7/6}\int C_n^2(z)(z)^{5/6}dz \tag{12}$$

We thus use, for figures of merit, $$Z^{5/3}\equiv\int_{5\text{km}}^{z\text{max}}C_n^2(z)(z)^{5/3}dz \tag{13}$$

and $$Z^{5/6}\equiv\int_{5\text{km}}^{z\text{max}}C_n^2(z)(z)^{5/6}dz \tag{14}$$

The lower limits on these integrals were chosen to avoid the boundary layer, and all altitudes, z, are distances above ground as opposed to "above sea level".

Comparisons: Clear-1 Data

During the CLEAR-1 program we obtained data from 49 thermosonde flights. To compare results from standard radiosondes we used the routine meteorological flights from El Paso located about 50 miles from the thermosonde launch site. Only those thermosonde flights nearest in time to radiosonde launches were used in our comparisons. Table 1 lists the flight information. FIGS. 4, 5, and 6 show examples of the profiles. Tables 2 and 3 list the figure of merit comparisons, and Table 4 gives the percentage error comparisons of $Z^{5/3}$.

TABLE 1

CLEAR-1 Flights

| Flight Number | 1984 Date | Launch, PM Thermosonde Serial No. | El Paso Thermosonde Time (Local, S.T.) | Radiosonde Local S.T. | Altitude Ranges (km) |
|---|---|---|---|---|---|
| 1 | 9/4 | 0508 | 1:48 | 5:00 | 5.3–15.3 |
| 2 | 9/5 | 0506 | 1:05 | 5:00 | 6.0–15.3 |
| 3 | 9/6 | 1885 | 2:05 | 5:00 | 5.7–15.3 |
| 4 | 9/7 | 1882 | 2:17 | 5:00 | 6.1–15.2 |
| 5 | 9/8 | 0524 | 1:43 | 5:00 | 5.8–15.3 |
| 6 | 9/10 | 1878 | 5:40 | 5:00 | 6.1–15.1 |
| 7 | 9/11 | 1889 | 8:03 | 5:00 | 8.8–15.2 |
| 8 | 9/13 | 2703 | 2:01 | 5:00 | 5.9–15.3 |
| 9 | 9/16 | 2757 | 7:51 | 5:00 | 5.2–15.2 |
| 10 | 9/18 | 2769 | 1:53 | 5:00 | 5.3–15.4 |
| 11 | 9/24 | 2762 | 8:08 (Launch) | 5:00 | 5.2–15.2 (TROPO.) |

TABLE 2

Isoplanatic Angle figures of Merit "$Z^{5/3}$"

| Flight Number | AFGL | Radiosonde Models "$Z^{5/3}$" × $10^{7}$‡ HUF | VZ | Thermosonde "$Z^{5/3}$" × $10^{7}$ (Experiment) |
|---|---|---|---|---|
| 1 | 3.93* | 1.84 | 3.35 | 4.50 |
| 2 | 8.27* | 1.30 | 3.52 | 10.9 |
| 3 | 4.63 | 1.49 | 3.40* | 3.81 |
| 4 | 7.83 | 3.36* | 13.0 | 2.67 |
| 5 | 7.12 | 2.80* | 5.92 | 3.76 |
| 6 | 6.62 (71)** | 1.09 | 2.25* | 2.29 |
| 7 | 4.46 | 0.618 | 2.39* | 2.42 |
| 8 | 4.84 (6)** | 1.25 | 2.42* | 2.45 |
| 9 | 4.43* | 0.665 | 2.72 | 5.05 |
| 10 | 7.13 | 0.860 | 3.83* | 4.79 |
| 11 | 7.50 (9)** | 4.93* | 5.42 | 2.03 |
| TOTAL | 3 | 3 | 5 | |

*= closest model

†MODEL: 1.566 + 40.03 $S_{raw}$ (TROPO, almost exclusively) 0.5033 + 51.32 $S_{raw}$ (STRAT.) Only two significant figures are really involved here, as well as in all the other tables below. These two models are in reference to Eq. (8) for Y.

**All numbers in these tables in parentheses are based on the unsaturated model when this differs from the saturated model. Note that they occasionally are "wild", thus the need for saturation.

‡This means that $Z^{5/3}$ is first multiplied by $10^{7}$ and the result is entered into the table.

TABLE 3

Scintillation Variance Figures of Merit "$Z^{5/6}$"

| Flight Number | AFGL | Radiosonde Models "$Z^{5/6}$" × $10^{10}$ HUF | VZ | Thermosonde "$Z^{5/6}$" × $10^{10}$ (Experiment) |
|---|---|---|---|---|
| 1 | 1.77* | 0.857 | 1.71 | 1.78 |
| 2 | 4.25* | 0.595 | 1.73 | 4.10 |
| 3 | 2.41 (3) | 0.688 | 1.84* | 1.73 |
| 4 | 3.14 | 1.48* | 5.63 | 1.14 |
| 5 | 2.8 | 1.25* | 2.82 | 1.57 |
| 6 | 2.70 (30) | 0.502 | 1.05* | 1.08 |
| 7 | 1.64 | 0.252 | 0.982* | 0.918 |
| 8 | 2.42 | 0.575 | 1.20* | 0.986 |
| 9 | 2.05* | 0.348 | 1.33 | 2.36 |
| 10 | 3.38 | 0.432 | 1.85* | 2.35 |
| 11 | 3.70 | 2.21* | 2.73 | 0.773 |
| TOTAL | 3 | 3 | 5 | |

*= closest model

MODEL: 1.566 + 40.03 $S_{raw}$ (TROPO, almost exclusively) 0.503 + 51.32 $S_{raw}$ (STRAT.)

TABLE 4

Percentage Error Comparisons for isoplanatic Angle {(Model - Exper.)/Exper.] × 100%}

| Flight Number | AFGL | HUF | VZ | ($Z^{5/3}$ ONLY) |
|---|---|---|---|---|
| 1 | −13 | −59 | −25 | |
| 2 | −24 | −88 | −67 | |
| 3 | 22 | −60.9 | 10.8 | |
| 4 | 193 | 25.8 | 386 | |
| 5 | 89 | −25.5 | 57.5 | |
| 6 | 189 | −52.4 | −1.75 | |
| 7 | 84 | −74 | −1.24 | |
| 8 | 98 | −49 | −1.22 | |
| 9 | −12.3 | −86 | −46 | |
| 10 | 49 | −82 | −20 | |
| 11 | 269 | 142 | 160 | |

Up until this point our conclusions (based on Tables 1–4) are that (a) the VanZandt model gave the closest values to the thermosonde the largest number of times, and (b) it also came the closest in value if one eliminates the two worst cases in all of them.

Tables 2–4 were supplemented by Tables 5 and 6, which used an alternative model as indicated. Despite the large apparent difference in these regressions, as seen in FIGS. 2 and 3 in comparison to FIG. 7 and in the models, as indicated explicitly in the tables, the results were hardly affected, and the relative scores of the models did not change. FIG. 7 shows the alternative tropospheric model (the one used almost exclusively in the sense that the stratospheric model was not used significantly, since CLEAR-1 radiosonde data were almost entirely limited to the tropospheric altitudes). Over the $S_{raw}$'s of interest, the regression almost overlays the one in FIG. 2 and this explains why the results were "robust" to model change.

Tables 2, 3, and 4, which compare the three models (AFGL, HUF, VZ), while showing a modest advantage to the VZ model do not compare the computational prices or loads of these models. The HUF model is clearly the simplest model, but it is significantly inferior in performance. The AFGL model (called the "Dewan Model" by the scientists at AFRL currently doing research on it) is extremely simple in comparison to the VZ model. In fact the complexity of the VZ model is so great that the computational burden it would impose makes it useless for the purpose of using it as an electronic decision aid (i.e., by imbedding it into a weather forecasting program). For this reason the AFGL model is unique for turbulence forecasting and it is this which gives this invention its advantage over other approaches. It is the most simple model with ability to forecast optical turbulence to the degree of accuracy needed.

TABLE 5

Isoplanatic Angle Figures of Merit From Alternative Model "$Z^{5/3}$"

| Flight Number | AFGL | Radiosonde Models "$Z^{5/3}$" × $10^{7}$ HUF** | VZ** | Thermosonde "$Z^{5/3}$" × $10^{7}$ (Experiment)** |
|---|---|---|---|---|
| 1 | 3.45* | 1.84 | 3.35 | 4.50 |
| 2 | 6.92* | 1.30 | 3.52 | 10.9 |
| 3 | 5.00 | 1.49 | 3.40* | 3.81 |
| 4 | 4.91 | 3.36* | 13.0 | 2.67 |
| 5 | 6.48 | 2.80* | 5.92 | 3.79 |
| 7 | 3.97 | 0.618 | 2.39* | 2.42 |
| 8 | 5.24 | 1.25 | 2.42* | 2.45 |
| 9 | 3.99 | 0.665 | 2.72 | 5.05 |

TABLE 5-continued

Isoplanatic Angle Figures of Merit From Alternative Model "$Z^{5/3}$"

| Flight Number | AFGL | Radiosonde Models "$Z^{5/3}$" × $10^7$ HUF** | VZ** | Thermosonde "$Z^{5/3}$" × $10^7$ (Experiment)** |
|---|---|---|---|---|
| 10 | 6.31 | 0.860 | 3.83* | 4.79 |
| 11 | 6.79 | 4.93 | 5.42 | 2.03 |
| TOTAL | 3 | 3 | 4 | |

*= closest model
**exactly as in Table 2
MODEL: 1.566 + 29.62 $S_{raw}$, Troposphere 0.5084 + 37.01 $S_{raw}$, Stratosphere

TABLE 6

| Flight Number | AFGL | Radiosonde Models "$Z^{5/6}$" × $10^{10}$ HUF** | VZ** | Thermosonde "$Z^{5/6}$" × $10^{10}$ (Experiment) |
|---|---|---|---|---|
| 1 | 1.55 | 0.857 | 1.71* | 1.78 |
| 2 | 3.51* | 0.595 | 1.73 | 4.10 |
| 3 | 2.74 | 0.688 | 1.84* | 1.73 |
| 4 | 2.00 | 1.48* | 5.63 | 1.14 |
| 5 | 2.50 | 1.25* | 2.82 | 1.57 |
| 7 | 1.40 | 0.252 | 0.982* | 0.918 |
| 8 | 2.15 | 1.575 | 1.20* | 0.986 |
| 9 | 1.85* | 0.348 | 1.33 | 2.36 |
| 10 | 2.97* | 0.432 | 1.85 | 2.35 |
| 11 | 2.73 | 2.21* | 2.75 | 0.773 |
| TOTAL | 3 | 3 | 4 | |

*= closest model
**exactly as in Table 3
MODEL: 1.566 + 29.62 $S_{raw}$, Troposphere 0.5084 + 37.01 $S_{raw}$, Stratosphere NOTE: In Tables 5 and 6, flight number 6 was omitted.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. An electronic decision aid process to position an electromagnetic emission device in a location which will have a minimum of optical turbulence between it an a target, the process comprising the steps of:

predicting levels of optical turbulence between the target and each location in a set of potential emission locations from which the electromagnetic emission device will project an emission towards the target; and selecting an optimum emission location which has a lowest level of optical turbulence discovered in the predicting step.

2. An electronic decision and process as defined in claim 1, wherein the electromagnetic emission device is an airborne laser.

3. An electronic decision aid device, as defined in claim 2, wherein said predicting and selecting steps are performed by a computer where the predicting step is performed by $$C_n^2 = 2.8 M^2 L^{4/3}$$

where:

$$M^2 = \left[\left(\frac{79 \times 10^{-6} P}{T^2}\right)\left(\frac{dT}{dz} + \gamma\right)\right]^2$$

and where T is absolute atmospheric temperature in °K, P is pressure in mb, γ is the dry adiabatic lapse rate of $9.8 \times 10^{-3}$ °K/m, and z is the height above ground.

4. A process, as defined in claim 3, wherein the largest scale of inertial range turbulence L is estimated by 0.1 times a thickness of a turbulent layer measured by a radiosonde.

* * * * *